J. O. SUMMERVILLE.
AUTOMATIC WAGON BRAKE.
APPLICATION FILED SEPT. 8, 1914.
1,164,678.
Patented Dec. 21, 1915.
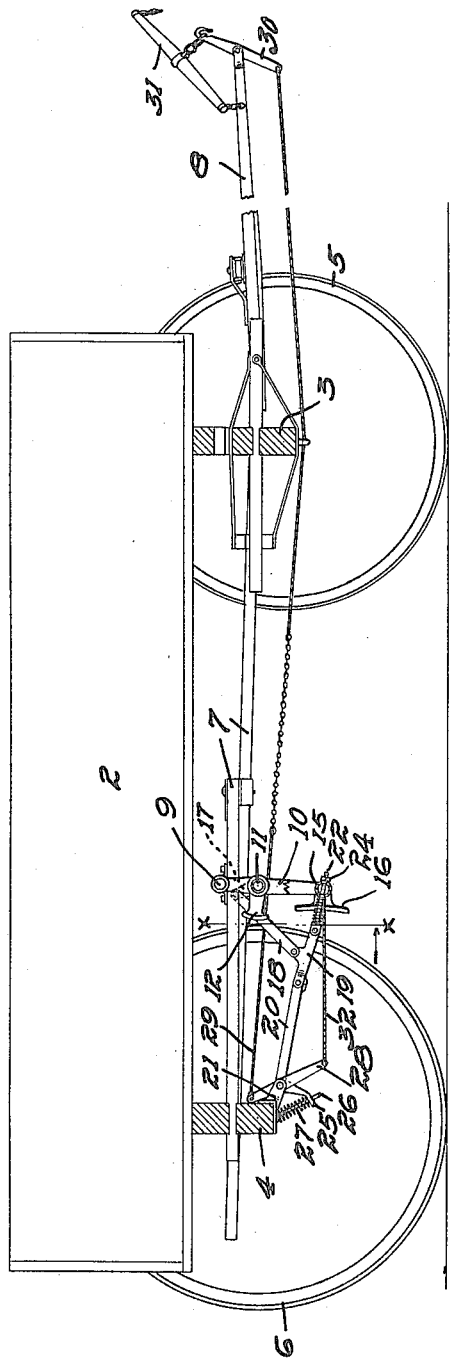
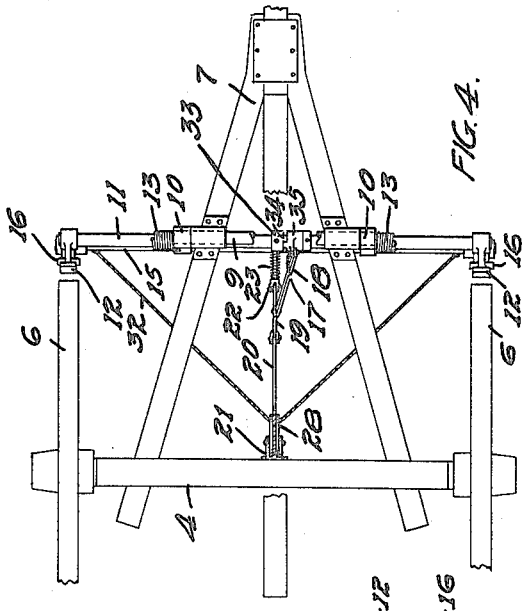
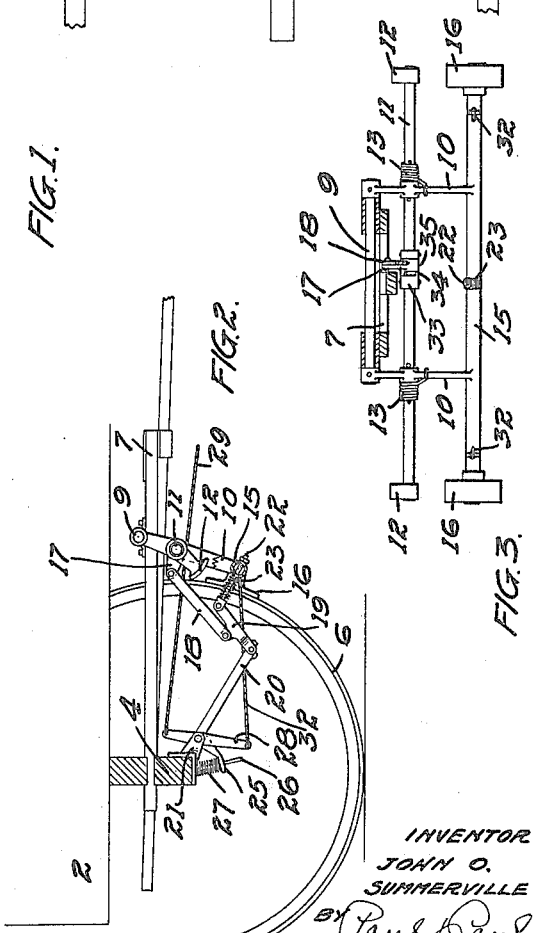
WITNESSES
M. R. McInnis
E. A. Paul
INVENTOR
JOHN O. SUMMERVILLE
BY Paul & Paul
ATTORNEYS
COLUMBIA PLANOGRAPH CO., WASHINGTON, D. C.

UNITED STATES PATENT OFFICE.

JOHN O. SUMMERVILLE, OF MINNEAPOLIS, MINNESOTA.

AUTOMATIC WAGON-BRAKE.

1,164,678.  Specification of Letters Patent.  Patented Dec. 21, 1915.

Application filed September 8, 1914. Serial No. 860,524.

*To all whom it may concern:*

Be it known that I, JOHN O. SUMMERVILLE, citizen of the United States, resident of Minneapolis, county of Hennepin, State of Minnesota, have invented certain new and useful Improvements in Automatic Wagon-Brakes, of which the following is a specification.

My invention relates to an automatic brake that is capable of application to any ordinary wagon.

The object of the invention is to provide a brake which will be automatically applied when the wagon is going down a hill, and a further and particular object is to provide a brake device which, while being automatically set by the holding back of the team in going down hill, will not act as a brake when the team is backing the wagon.

Other objects of the invention will appear from the following detailed description.

The invention consists generally in various constructions and combinations, all as hereinafter described and particularly pointed out in the claims.

In the accompanying drawings forming part of this specification, Figure 1 is a longitudinal sectional view through a wagon with my invention applied thereto, illustrating the brake in its normal, inactive position, Fig. 2 is a detail sectional view, illustrating the position assumed by the parts when the brake is set, Fig. 3 is a section on the line *x—x* of Fig. 1, looking in the direction of the arrow, Fig. 4 is a plan view, showing the manner of mounting the brake device on the running gear of the wagon.

In the drawing, 2 represents a wagon box having axles 3 and 4 and carrying wheels 5 and 6. Between the axles suitable reaches 7 are arranged and the forward axle is provided with a draft tongue 8. Mounted upon the reach 7 is a shaft 9, provided with depending arms 10 at the middle portion of which a shaft 11 is mounted. On the shaft 11 dogs 12 are secured, in position to be moved into contact with the rear wheels, as will hereinafter appear. A spring 13 normally holds the shaft 11 and the dogs 12 in their inactive position. A shaft 15 is mounted on the arms 10 and provided with brake shoes 16 having surfaces to contact with and grip the rear traction wheels. An arm 17 is mounted on the shaft 11 and a link 18 pivotally connects this arm with a toggle device consisting of a link 19 to the middle of which the link 18 is pivotally connected, and a link 20 is pivotally connected to one end of the link 19 and at its other end to a bracket 21 that is rigidly mounted on the rear axle. A rod 22 is pivotally connected with the other end of the link 19 and is slidably connected with the shaft 15. A spring 23 is mounted on said rod and normally resists its movement on said shaft in one direction. The rod has a threaded end and nuts 24 thereon for adjusting the rod lengthwise and regulating the tension of the spring. An arm 25 is mounted on the link 20 and is slidable on a rod 26 against the compression of a spring 27 on the rod. A rocker bar 28 is mounted on the bracket 21 and a cable 29 is connected to one end of said bar and extends forward to a rocker 30 that is mounted on the wagon pole 8 and supports a neck yoke 31. A short length of cable 32 connects the lower end of the rocker bar 28 with the end of the shaft 15, as indicated in Fig. 3.

From the foregoing description it will be noted that when there is a backward pull on the neck yoke, resulting from the push of the wagon in going down hill, the dogs 12 will be moved into engagement with the rear wheels and the forward movement of the wheels will push the dogs down from the position indicated in Fig. 1 to that shown in Fig. 2, breaking the toggle joint and drawing the brake shoe snugly against the wheel, thereby automatically setting the brakes. In backing the team, there would be the same strain exerted on the neck yoke 31 as there would be when the team is holding back the wagon on an incline, and I therefore make provision for preventing the setting of the brakes when the wheels are rolled backward by the backing of the team. To this end I provide a collar 33 secured on the shaft 11 which carries an arm 17 with which the link 18 is connected. With this construction the rocking of the shaft 11 in one direction when the wheels are rolling forward, as in going down hill, will transmit movement through the loosely mounted hub 34 to the toggle device and set the brake shoes, while a corresponding movement of the collar 35 in the opposite direction, resulting from the backward roll of the wheels, as in backing the wagon, would have no effect on the toggle device and would not set the brake shoes. The apparatus is therefore operative to set the brakes and hold the wagon in going down hill, but will offer no obstruction whatever to the backward movement of the wagon.

In various ways the details of construction herein shown and described may be modified and still be within the scope of my invention.

I claim as my invention:

1. The combination, with a wagon running gear and rear wheels, of brake dogs mounted adjacent to said wheels, means operatively connecting said dogs with the wagon neck yoke for moving them into engagement with said wheels when backward pull is applied to said yoke, said dogs being mounted for downward movement with the forward roll of said wheels, brake shoes adjacent to said wheels, means operatively connecting said brake shoes with said dogs for moving said shoes into engagement with said wheels on the downward movement of said dogs.

2. The combination, with a vehicle running gear, of an automatic brake device comprising dogs for engagement with the rear wheels and means operatively connecting said dogs with the neck yoke, whereby backward pull on the neck yoke will seat said dogs against the wheels, said brake device also including brake shoes, and mechanism operatively connecting said shoes with said dogs for seating said shoes against the rear wheels when said dogs are moved in one direction by engagement with said wheels, said mechanism being ineffective to operate said shoes when said dogs are moved in the opposite direction said shoes and dogs being disposed in contiguous relation in front of the wheels.

3. The combination, with a vehicle running gear, of an automatic brake mechanism comprising dogs mounted for engagement with the rear wheels and brake shoes also arranged to engage the rear wheels, a toggle mechanism connecting said dogs and brake shoes with said running gear, and including means for seating said shoes against the wheels when said dogs are moved in one direction by contact with the wheels, and means operatively connecting said dogs with the vehicle neck yoke.

4. The combination, with a wagon running gear and rear wheels, of brake shoes mounted adjacent to said wheels and in front of the same, a neck yoke and mechanism connecting said shoes with said yoke, disposed in front of the wheels and mechanism mounted for engagement with the wheels when backward pull is applied to said neck yoke and the wheels are rolling forward down an incline, said mechanism also including means for preventing the engagement of said shoes with said wheels when a backward pull is applied to said neck yoke and the wheels are rolling backward.

In witness whereof, I have hereunto set my hand this 3d day of September, 1914.

JOHN O. SUMMERVILLE.

Witnesses:
GENEVIEVE E. SORENSEN,
EDWARD A. PAUL.

Copies of this patent may be obtained for five cents each, by addressing the "Commissioner of Patents, Washington, D. C."